United States Patent [19]

Shearing

[11] 4,211,680

[45] Jul. 8, 1980

[54] QUICK-SET COMPOSITIONS OF HYDRAULIC CEMENT, SILICA, WATER, POLYISOCYANATE AND POLYOL

[75] Inventor: Herbert J. Shearing, Manchester, England

[73] Assignee: Imperial Chemical Industries Limited, London, England

[21] Appl. No.: 911,518

[22] Filed: Jun. 1, 1978

Related U.S. Application Data

[63] Continuation of Ser. No. 649,483, Jan. 15, 1976, abandoned, which is a continuation of Ser. No. 463,137, Apr. 22, 1974, abandoned, which is a continuation of Ser. No. 226,301, Feb. 14, 1972, abandoned, which is a continuation-in-part of Ser. No. 818,083, Apr. 21, 1969, abandoned.

[30] Foreign Application Priority Data

May 13, 1968 [GB] United Kingdom ............... 22624/68

[51] Int. Cl.² .................. C08L 75/06; C08L 75/08
[52] U.S. Cl. ......................... 260/29.2 TN; 260/37 N; 260/40 TN
[58] Field of Search ........ 260/29.2 TN, 37 N, 40 TN

[56] References Cited

U.S. PATENT DOCUMENTS

| | | | |
|---|---|---|---|
| 2,650,212 | 8/1953 | Windemuth | 260/29.2 TN |
| 2,902,388 | 9/1959 | Szukiewicz | 260/29.2 TN |
| 3,211,675 | 10/1965 | Johnson | 260/29.2 TN |
| 3,240,736 | 3/1966 | Beckwith | 260/29.2 TN |
| 3,333,974 | 8/1967 | Sherr | 106/111 |
| 3,354,099 | 11/1967 | Stegeman | 260/29.2 TN |

FOREIGN PATENT DOCUMENTS

| | | | |
|---|---|---|---|
| 893273 | 4/1962 | United Kingdom | 260/29.2 TN |
| 1192864 | 5/1970 | United Kingdom | 260/29.2 TN |

OTHER PUBLICATIONS

Dombrow, "Polyurethanes," Second Ed., Reinhold, 1965, p. 149.

*Primary Examiner*—Murray Tillman
*Assistant Examiner*—Arthur H. Koeckert
*Attorney, Agent, or Firm*—Cushman, Darby & Cushman

[57] ABSTRACT

Cement compositions which are the products obtained by mixing together and allowing to cure a hydraulic cement, a silica filler, water, an organic polyisocyanate and a polyol, the organic polyisocyanate being employed in an amount sufficient to provide an excess of isocyanate groups over the hydroxyl groups of the polyol. The compositions are particularly suitable for flooring applications and the mixtures, once made up, set very rapidly.

8 Claims, No Drawings

QUICK-SET COMPOSITIONS OF HYDRAULIC CEMENT, SILICA, WATER, POLYISOCYANATE AND POLYOL

This application is a continuation of application Ser. No. 649,483, filed Jan. 15, 1976, now abondoned, which application is a continuation of application Ser. No. 463,137, filed Apr. 22, 1974, now abandoned, which application is in turn a continuation of application Ser. No. 226,301, filed Feb. 14, 1972, now abandoned. Ser. No. 226,301 was a continuation-in-part of application Ser. No. 818,083, filed Apr. 21, 1969 and now abandoned.

The present invention relates to new cement compositions suitable, for example, for the manufacture of floors.

It has been found that fast setting cement compositions can be obtained by adding organic polyisocyanate and polyol materials to conventional hydraulic cement-/sand/water mixes.

Thus according to the invention there are provided cement compositions which are the products obtained by mixing together and allowing to cure a hydraulic cement, a silica filler, water an organic polyisocyanate and a polyol, the organic polyisocyanate being employed in an amount sufficient to provide an excess of isocyanate groups over the hydroxyl groups of the polyol.

The term "hydraulic cement" is used in its usual sense to denote the class of structural materials which are applied in admixture with water and thereafter harden or set as a result of physical or chemical changes which consume the water present. As well as Portland cement, it includes :

1. Rapid hardening cements, as characterised by those with high alumina contents.
2. Low-heat cements as characterised by high percentages of dicalcium silicate and tetracalcium alumino ferrite and low percentages of tricalcium silicate and tricalcium aluminate.
3. Sulphate resisting cements as characterised by unusually high percentages of tricalcium silicate and dicalcium silicate and unusually low percentages of tricalcium aluminate and tetracalcium alumino ferrite.
4. Portland blast-furnace cement as characterised by a mixture of Portland cement clinker and granulated slag.
5. Masonry cements as characterised by mixtures of Portland cement and one or more of the following : hydrated lime, granulated slag, pulverised limestone, colloidal clay, diatomaceous earth or other finely divided forms of silica, calcium stearate and paraffin.
6. Natural cements as characterised by material obtained from deposits in the Lehigh Valley, U.S.A.
7. Lime cements as characterised by oxide of calcium in its pure or impure forms and whether contaning or not some argillaceous material.
8. Selenitic cement as characterised by the addition of 5-10% of plaster of Paris to lime.
9. Pozzolanic cement as characterised by the mixture of pozzolana, trass kieselguhr, pumice, tufa, santorin earth or granulated slag with lime mortar.
10. Calcium sulphate cements as characterised by those depending on the hydration of calcium sulphate and includes plaster of Paris, Keene's cement and Parian cement.

As slica fillers which may be used, there may be mentioned sands and silicas of low clay content, preferably washed and having a particle size mainly within the range $1\frac{1}{2}"$–200 B.S. sieve size, although sizes outside these limits may be used for special applications.

As organic polyisocyanates which may be used, there may be mentioned tolylene diisocyanate and diphenyl methane diisocyanate, also uretedione or isocyanurate polymers of these, and isocyanate-ended polyurethanes obtained by reacting an excess of an organic diisocyanate with a polyfunctional isocyanate-reactive compound such as a glycol or higher polyhydric alcohol, an amino alcohol or polyamine or a hydroxyl-ended polyester, polyesteramide or polyether.

The preferred polyol for use in this invention is a dihydric or trihydric polyether having an equivalent weight from 100 to 1500, but polyhydric alcohols, aminoalcohols, polyesters and polyesteramides can also be used.

Such polyols include, for example, oxypropylated glycerol, oxypropylated triethanolamine, the hydroxyl-ended polymers obtained by reaction of a polyisocyanate such as tolylene diisocyanate with excess of a hydroxyl-ended polyester, polyesteramide or polyether, hydroxyl group-containing polyether resins obtained by reacting diphenylolpropane with epichlorohydrin and alkyd resins both drying and non-drying.

Solvents and thinners which are inert towards isocyanate groups may also be added. Examples of such inert solvents are esters, ketones, hydrocarbons and chlorinated hydrocarbons.

The proportions of the different ingredients used in the present composition may be varied widely. Thus per 100 parts by weight of cement there may be used from 10 to 10,000 parts by weight of filler, from 10 to 75 parts by weight of water, from 5 to 5,000 parts by weight of resin-forming components, defined as organic polyisocyanate plus isocyanate-reactive organic compound, and from 0 to 200 parts by weight of solvents. Preferred quantities are from 50 to 8000 parts of filler, 20–50 parts of water, 10 to 4000 parts of urethane resin and 0–100 parts of solvent.

The composition of the invention, according to their fluidity, may be used as self-levelling or trowelling flooring finishes and are superior to ordinary cement floorings or other known resin-bonded cement flooring compositions by their rate of setting; according to the invention it is possible to obtain floors which are sufficiently stable to walk upon within the hour and withstand the falling weight impact test of DEF 1053, method 17(a) after only 24 hours curing.

The invention is illustrated by the following Examples in which parts are by weight

EXAMPLE 1

100 Parts of Portland cement and 100 parts of 70% solution of a polyisocyanate (obtained as described below) are mixed together and then 100 parts of sand of 30-200 BS Sieve Size, 25 parts of water and 10 parts of an oxypropylated glycerol of hydroxyl value 535 mg. KOH/g. are mixed in.

A quick-setting fluid composition is obtained which when spread in a layer $\frac{1}{8}$ inch thick quickly solidifies and is firm enough to walk on in 2–2$\frac{1}{2}$ hours.

The polyisocyanate used can be obtained by heating a mixture of tolylene diisocyanate (1 mole), trimethylolpropane (0.197 mole) and butylene glycol (0.159 mole) for 2 hours at 60° C. in the presence of half their combined weight of a 1:1 mixture of β-ethoxy ethylacetate and xylene. 0.029 Mole of an oxypropylated glycerol of molecular weight 3000 is added and heating is continued for 4 hours at 60° C. Sufficient xylene is then added to give a solution of 70% solids content.

EXAMPLE 2

If the oxypropylated glycerol used in Example 1 (paragraph 1) is replaced by 10 parts of an oxypropylated triethanolamine of molecular weight 320, an even faster setting composition is obtained.

This is sufficiently hard to be walked upon 1 hour after spreading.

EXAMPLE 3

| | |
|---|---|
| Cement | 100 parts |
| isocyanate (see below) | 50 parts |
| sand | 100 parts |
| water | 19 parts |
| oxypropylated glycerol (OH value 535 mg./g.) | 10 parts | gives a composition whih can be walked upon one hour after spreading.

The isocyanate used is the product obtained by reacting together 1 mole of tolylene diisocyanate, 0.22 mole of glycerol and 0.18 mole of diethylene glycol is ⅓ their combined weight of ethyl acetate at 75°-80° C. for 3 hours.

EXAMPLE 4

If the isocyanate used in Example 3 is replaced by 60 parts of the product obtained by reacting coal tar pitch containing 2% by weight of hydroxyl groups (or their equivalent of isocyanate-reactive groups) with diphenylmethane diisocyanate (6.5 equivalents) as 85% solution in 2-methyl-2-methoxypentan-4-one at 90° C. for 4 hours, the resultant composition can be walked on in 1 hour after spreading.

EXAMPLE 5

| | |
|---|---|
| Cement | 100 parts |
| diphenylmethane diisocyanate | 40 parts |
| sand | 100 parts |
| water | 15 parts |
| oxypropylated glycerol (as in Example 1) | 10 parts |

This composition can be walked upon 1 hour after spreading.

EXAMPLE 6

| | |
|---|---|
| Cement | 100 parts |
| tolylene diisocyanate | 14.5 parts |
| sand | 100 parts |
| water | 25 parts |
| oxypropylated glycerol (as in Example 1) | 10 parts |

This composition can be walked upon in about 30 minutes after spreading.

EXAMPLE 7

If the tolylene diisocyanate used in Example 6, is replaced by 200 parts of the following mixture, a similar quick setting composition is obtained.

A polyethylene/propylene (7:3) adipate of mol. wt. about 1000 is condensed with 1.43 equivalents of tolylene diisocyanate and the resultant product (1 part) is mixed with 1 part of an isocyanurate polymer of tolylene diisocyanate of NCO value 14.8% in 0.5 part of 2-methyl-2-methoxy-pentan-4-one and 1.5 parts of butyl acetate.

EXAMPLE 8

100 parts by weight of cement are mixed into 43 parts of a 75% solution in ethyl glycol acetate/xylene (1:1) of a reaction product of hexamethylene diisocyanate, and water having an isocyanate content of about 16%. To this mixture are added with further mixing 100 parts of sand, 20 parts of water, and 10 parts of oxypropylated glycerol of OH value 535 mg. KOH/g. A fast drying urethane bonded concrete is obtained which is hard enough to walk on in 1-1½ hours.

EXAMPLE 9

100 Parts by weight of cement are mixed into 50 parts of a 75% solution in ethyl glycol acetate/xylene (1:1) of a reaction product of hexamethylene diisocyanate, trimethylol propane and 1:3 butane diol having an isocyanate content of about 12%. To this mixture are added with further mixing 100 parts of sand, 25 parts of water and 10 parts of oxypropylated glycerol of OH value 535 mg. KOH/g. A fast drying urethane bonded concrete is obtained which is hard enough to walk on in 1-1½ hours.

EXAMPLE 10

If the oxypropylated glycerol used in Example 1 is replaced by 30 parts of a polyester obtained by condensing together, 1,3-butylene glycol, hexanetriol and adipic acid in the molar ratio 3:1:3 and having an acid value below 3 mg. KOH/g. a self-levelling composition is obtained which sets in about 1 hour.

EXAMPLE 11

If the oxypropylated glycerol used in Example 1 is replaced by 30 parts of a solution of a polyesteramide-polyurethane condensation product prepared as described below, a composition is obtained which requires spreading and which sets in 30–60 minutes.

The solution of polyesteramide-polyurethane condensation product used in this Example is prepared by the following method:

A polyesteramide is prepared by heating a mixture of 4330 parts of adipic acid, 1820 parts of ethylene glycol, 177 parts of diethylene glycol and 113 parts of monoethanolamine at 240° C. under reflux until an acid value of 2.0 to 3.0 mg. KOH/g. is obtained and the product has a molecular weight of 1850.

A mixture of 1533 parts of the above polyesteramide, 2108 parts of methyl ethyl ketone, 2.08 parts of water, 10.75 parts of ethylene glycol, 0.77 part of dimethylaminopyridine and 188.5 parts of an 80:20 mixture of 2,4- and 2,6-tolylene diisocyanates is stirred at 57° to 63° C. until the viscosity of a sample measured at 25° C. reaches a value between 100 and 140 poises. 13.5 Parts of methanol are then added and the mixture is stirred at the same temperature for 3 hours. 0.38 part of salicyclic acid is then added and the mixture is stirred at the same temperature for 1 hour, then cooled. The polyesteramide-polyurethane solution so obtained is then ready to use.

The amount of water stated is the total present, the actual amount added taking into account any small amounts present in the solvent.

EXAMPLE 12

If the oxypropylated glycerol used in Example 1 is replaced by 30 parts of a 50% w/w solution in xylene of a dehydrated castor oil modified glyceryl phthalate resin (a non-drying alkyd resin) a very thick composition is obtained which requires spreading but which sets in about 30 minutes.

EXAMPLE 13

If the oxypropylated glycerol used in Example 1 is replaced by 30 parts of a 50% w/w solution in toluene of a reaction product from heating glycerol, palm kernel oil fatty acids, ground nut oil fatty acids, stearic acid and phthalic anhydride (a drying alkyd resin) a very thick composition is obtained which requires spreading but which sets in about 30 minutes.

EXAMPLE 14

If the oxypropylated glycerol used in Example 1 is replaced by 42 parts of a 50% w/w solution in methyl ethyl ketone of a polyester resin obtained by reacting diphenylolpropane with epichlorohydrin so that the resulting product has a hydroxyl value of about 130 mg. KOH/g., a composition is obtained which is easily pourable and self-levelling, and which sets hard enough to walk on in 5-6 hours.

EXAMPLE 15

| | |
|---|---|
| Cement | 100 parts |
| Diphenylmethane diisocyanate prepolymer solution (see below) | 100 parts |
| Sand | 100 parts |
| Water | 25 parts |
| Oxypropylated glycerol MW ca.1000 (OH value 165 mg.KOH/g.) | 35 parts | gives a self-levelling composition which sets in about 1 hour.

The diphenylmethane diisocyanate prepolymer solution used in this example is obtained as follows:

100 Parts of oxypropylated glycerol of molecular weight about 1000 (hydroxyl value 165 mg. KOH/g.) is mixed with 25 parts of a solvent mixture consisting of 70% by weight of dry cyclohexanone and 30% by weight of xylene. 205 Parts of a commercially available 4,4'-diisocyanato-diphenylmethane of NCO content 30.0% is dissolved in a further 50 parts of the solvent mixture and the two solutions are mixed and stored in a dry, sealed container for 3 days, when the prepolymer is ready for use.

We claim:

1. Unfoamed cement compositions which are the products obtained by mixing together and allowing to cure a portland cement, a silica filler, water, an organic polyisocyanate and a polyol, the organic polyisocyanate being employed in an amount sufficient to provide an access of isocyanate groups over the hydroxyl groups of the polyol and the ratio of organic polyisocyanate and polyol taken together to water ranging from 0.98:1 to 8.4:1, the amount of water ranging from about 15 to 25% by weight that of said portland cement.

2. Cement compositions as claimed in claim 1 wherein the silica filler has a particle size within the range 1½ inches—200 B.S. sieve size.

3. Cement compositions as claimed in claim 1 wherein the polyol is a dihydric or trihydric polyether having an equivalent weight from 100 to 1500.

4. Cement compositions as claimed in claim 1 which also contain solvents or thinners which are inert towards isocyanate groups.

5. An unfoamed cement product suitable for use as a flooring composition obtained by mixing together and allowing to cure components consisting essentially of a portland cement, a silica filler, water, an organic polyisocyanate and a polyol, the organic polyisocyanate being employed in an amount sufficient to provide an excess of isocyanate groups over the hydroxyl groups of the polyol wherein the ratio of organic polyisocyanate and polyol taken together to water ranges from 0.98:1 to 8.4:1, the amount of water ranging from about 15 to 25% by weight to that of said portland cement.

6. A product according to claim 5, wherein said mixture of components is capable of being used as a self-leveling or trowelling flooring finish and said mixture is capable of solidifying at a rate sufficient to obtain a floor which is sufficiently stable to walk upon with an hour.

7. A product according to claim 6 which is capable of withstanding the falling weight impact test of DEF 1053, method 17(a) after only 24 hours of curing.

8. A product according to claim 5, wherein said polyisocyanate is selected from the group consisting of tolylene diisocyanate and diphenyl methane diisocyanate.

* * * * *